United States Patent [19]

Saito et al.

[11] Patent Number: 4,814,811
[45] Date of Patent: Mar. 21, 1989

[54] STILL CAMERA SYSTEM

[75] Inventors: Mitsuru Saito, Ibaraki; Tadahiro Yoshida; Yasuhiro Morimoto, both of Takatsuki; Nobuyuki Taniguchi, Nishinomiya, all of Japan

[73] Assignee: Minolta Camera Kabushiki Kaisha, Osaka, Japan

[21] Appl. No.: 210,189

[22] Filed: Jun. 22, 1988

Related U.S. Application Data

[63] Continuation of Ser. No. 128,443, Dec. 3, 1987, abandoned.

[30] Foreign Application Priority Data

Dec. 5, 1986 [JP] Japan ................................. 61-290122
Dec. 5, 1986 [JP] Japan ................................. 61-290123

[51] Int. Cl.[4] ...................... G03B 17/48; G03B 19/04; H04M 1/00
[52] U.S. Cl. .................... 354/412; 354/481; 354/75; 354/173.1; 354/234.1; 354/271.1; 354/289.12; 358/909
[58] Field of Search ................... 358/909; 354/75, 76, 354/288, 412, 481, 173.1, 234.1, 271.1, 289.12

[56] References Cited

U.S. PATENT DOCUMENTS

| | | | |
|---|---|---|---|
| 4,130,834 | 12/1978 | Mender et al. | 358/127 |
| 4,303,322 | 12/1981 | Someya | 358/909 X |
| 4,366,501 | 12/1982 | Tsunekawa et al. | 358/310 |
| 4,514,073 | 4/1985 | Taniguchi et al. | 354/414 |
| 4,551,764 | 11/1985 | Ogawa | 358/228 |
| 4,572,638 | 2/1986 | Nakai et al. | 354/286 |
| 4,584,598 | 4/1986 | Kutaragi | 358/29 |
| 4,599,657 | 7/1986 | Kinoshita et al. | 358/335 |
| 4,638,365 | 1/1987 | Kato | 358/228 |
| 4,639,111 | 1/1987 | Harvey | 354/481 |

FOREIGN PATENT DOCUMENTS 58-57868 4/1983 Japan.
59-104132 7/1984 Japan.
60-50568 4/1985 Japan.

OTHER PUBLICATIONS

Canon USA Brochure, Canon T90, 1985.

Primary Examiner—Michael L. Gellner
Attorney, Agent, or Firm—Burns, Doane, Swecker & Mathis

[57] ABSTRACT

A still camera system comprises a camera body which carrys alternatively a film back or a still video back having a solid-state image pickup device for receiving still images in order to record them on a recording medium. The improved system includes a display, a first means for providing the display information on the film back installing mode, and a second means for providing the display information on the still video back installing mode.

9 Claims, 10 Drawing Sheets

STILL CAMERA SYSTEM

This application is a continuation of application Ser. No. 128,443, filed Dec. 3, 1987, now abandoned.

BACKGROUND OF THE INVENTION AND RELATED ART STATEMENT

The present invention relates to a still camera system which is able to selectably load with a film back and a still video back.

There has been disclosed an electronic still camera which takes a still image using a solid-stage image pickup device such as a charge-coupled device (hereinafter referred to as CCD) and then records the still image on a magnetic disk. For example, at pages 80 to 85 of NIKKEI ELECTRONICS issued on July 2, 1984, a Japanese magazine has been introduced such a camera. Minolta Camera Kabushiki Kaisha, the assignee of this invention, has filed a Japanese Utility Model application of No. 36821/1986 relating to a still camera including a camera body to carry alternatively a still video back or a film back. This type of a still camera is constructed in such a manner that a still video back including a solid-state device and an image processing circuit is detachably mounted to a common camera body for carrying a film back. The camera is also constructed in such a manner that, even when loaded with the still video back, the camera remains compact in size and thus, the appearance of the camera is approximately similar to that of a popular single-lens reflex camera. Additionally, when loaded with the film back in place of the still video back, the camera can provide an image formed in the film plane in the same manner as a common single-lens reflex camera.

While a common film camera of a film back type has a display for indicating exposure control modes, a shutter speed, diaphragm aperture value, and a film count number of exposed frames of a film, however, if the still video back is attached thereto, readings including a frame/field recording mode and a track number in place of the film count number should be displayed in addition to the aforesaid readings. It is generally known that such specific information relating to the still video back is displayed on the still video back.

In such an arrangement, both of the displays on the camera body and the still video back should be observed at a time while the still video back is installed, which will cause a problem that a camera operator is required to read the information respectively.

Figure 13:
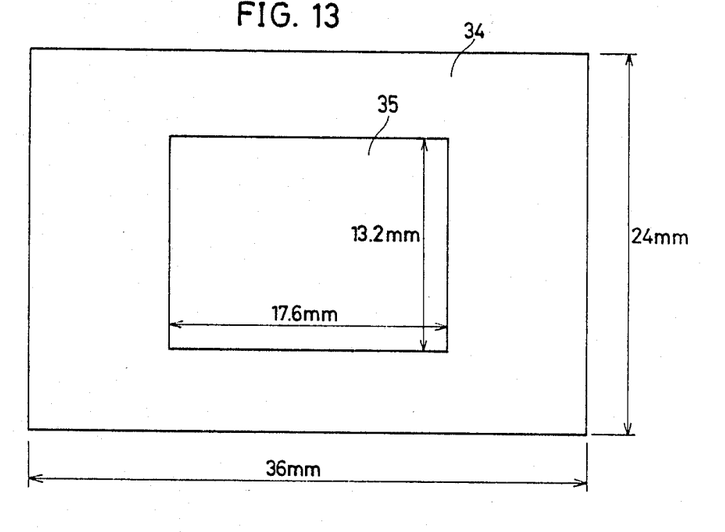
FIG. 13 is a view showing as comparing the two image receiving areas for the 35 mm film back and the still video back.

Additionally, the CCD image sensor contained within the still video back is generally ⅔-inch (8.6 mm×6.6 mm) or ½-inch (6.4 mm×4.9 mm) in measurements and smaller as compared to the size of a frame of a 35 mm film (36 mm×24 mm). For example, as shown in FIG. 13, when the CCD is ⅔-inch in size, its picture screen 35 on the film plane is 17.6 mm wide by 13.2 mm high at a reducing rate of ½ on a relay optical device contained within the still video back. It is possible to provide a picture image exactly on the CCD with the use of a relay optical device which can reduce the size of a 35 mm film screen to that of the CCD, which will be equivalent to filming on the 35 mm frame. However, in this case, such a relay optical device in the still video back becomes greater in size thus to decline the portability when the still video back is attached to the camera body.

Figure 14:
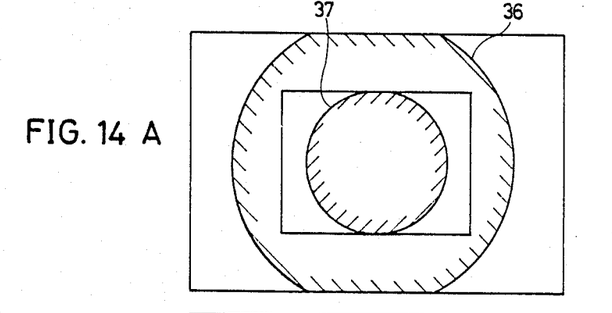

Therefore, a system has to be developed to meet the respective screen sizes of the film back and the still video back whichever is installed. In that case, there will be some elements, e.g. an area of measuring light and an area of focus detection, to be varied according to the size of a picture screen. Two resepctive areas of measuring light are shown in FIG. 14-A wherein an area 36 is for a 35 mm film while an area 37 is for the still video back. Similarly, two focus detecting areas are shown in FIG. 14-B wherein an area 38 is for a 35 mm film while an area 39 is for the still video back. Apparently, the light-measuring area and focus detecting area 37, 39 with the still video back installed becomes small in accordance with the size of the CCD. It will be a better idea that a frame display representing the frame of the focus detecting area in the viewfinder is changed in relation to the focus detecting area.

Furthermre, there will be some other elements to be changed and/or modified without relation to the size of a picture screen. For example, the information on film sensitivity required for exposure calculation has to be adjusted to that on equivalent film sensitivity determined by the sensitivity of CCD image sensor, and the restriction of shutter speed and diaphragm aperture value has to be ranged according to the attachment of the film back or the still video back. For a 35 mm film camera, diaphragm aperture ranges from the smallest opening to the greatest opening in an interchangeable lens to be used. When the still video back is installed, the available full opening aperture is limited in size by a diameter of a lens in a relay optical device provided in the still video back. That is, in case that the lens diameter of the relay optical device is smaller than the equivalent to the full-open diaphragm aperture value of the interchangeable lens, the result of calculation will be incorrect when measuring under the full-open diaphragm aperture. Consequently, when the still video back is installed, the available diaphragm aperture ranges from the smallest opening aperture to the interchangeable lens to whichever of the largest opening aperture in the interchangeable lens and the lens in the relay optical device is smaller.

When the shutter is slow, an S/N ratio according to a dark current in the CCD becomes smaller thus to reduce the quality of a picture image to be recorded, which is a specific set-back in CCD. Therefore, the shutter control has to be restricted on the slow side so as not to exceed a certain shutter speed such as ½ second or 2 second.

Furthermore, after a back cover of the camera body is opened, so-called initial film loading is carried out by advancing the film automatically until a not-exposed frame of the film is advanced to a photographic position. When the still video back is installed in place of a back cover, the initial loading is not required since erasing and recording on the magnetic disk can be effected automatically and electrically.

SUMMARY OF THE INVENTION

It is a first object of the present invention to provide a still camera system which displays with the still video back attached thereto in such a manner that the readings of photographing information are appropriate to the still video back installing mode and thus, facilitates checking of the readings in the still video back installing mode.

It is a second object of the invention to automatically provide an optimum condition for photographing while either the film back or the still video back is installed.

A still camera system of the present invention has a camera body which is arranged to carry alternatively a film back or a still video back having a solid-state image pickup device for receiving still images in order to record them on a recording medium, a display, a signal input means for receiving input signals indicating the attachment of either the film back or the still video back, a first means for providing the display information in a film back installing mode to said display, a second means for providing the display information in a still video back installing mode to said display, and a switching means for selecting between said first and second means corresponding to the input information of said signal input means; whereby the readings in the film back installing mode and the still video back installing mode are alternatively displayed on the display of the camera body.

Accordingly, one single display can visibly indicate all the information. Also, the display readings can be selected automatically. Furthermore, an optimum condition for photographing can be attained not only when the film back is installed but also when the still video back is installed.

BRIEF DESCRIPTION OF THE DRAWINGS

FIGS. 3-A, 3-B, and 3-C are views explaining the readings on the display.

FIGS. 14-A and 14-B are views showing respectively the areas of measuring light and focus detection with relation to the 35 mm film back and the still video back in a comparative manner.

DETAILED DESCRIPTION OF THE PREFERRED EMBODIMENT

Figure 1:
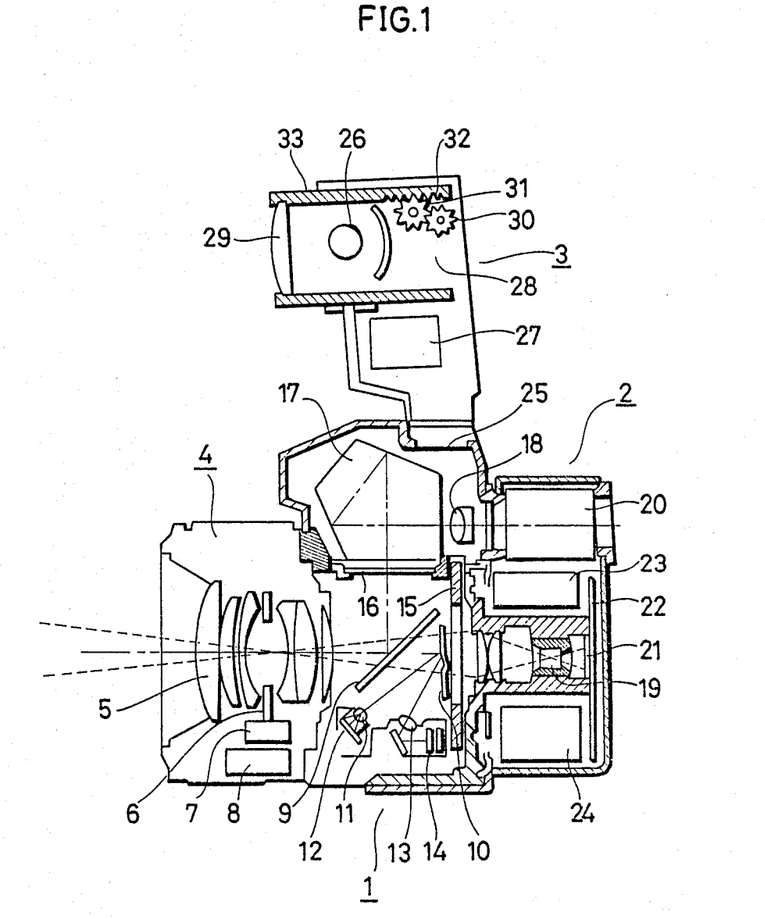
FIG. 1 is a longitudinally cross-sectional view of a still camera system with an electronic flash unit mounted thereto according to the present invention.

Referring to FIG. 1 showing a section of a still camera system of the present invention, a camera body 1 having the same construction as a usual single-lens reflex camera is loaded with a still video back 2 in place of a film back, and an electronic flash unit 3 mounted over a pentaprism 17. An interchangeable lens 4 is provided with an objective lens 5, a diaphragm aperture 6, a diaphragm aperture driving mechanism 7, and a ROM chip 8 holding information concerning the lens; such as a focal length and a full-open diaphragm aperture value. The camera body 1 carries a main mirror 9 for introducing an image to a viewfinder, a sub mirror 10 for reflecting light passed through a half transparent portion of the main mirror 9 for the light measurement and the focus detection, a photocell 12 for measuring the brightness of the subject in natural light or flashlight by receiving light reflected by the submirror 10 and passed through a lens 11, a CCD line sensor 14 for measuring the focussing condition of the interchangeable lens 4 by receiving light reflected by the submirror 10 and passed through a lens 13. The plane corresponding to the film plane is disposed near the rear surface of a focal plane shutter 15. A viewfinder portion in the camera body includes a focus plate 16, the pentaprism 17, and an eyepiece lens 18. The still video back 2 includes a relay optical portion 19 for reducing the image size of the 35 mm film frame to that of ⅔-inch, a relay viewfinder portion 20 for shifting the eyepoint of viewfinder to the rear of the still video back 2, a signal processing circuit board 22 having a CCD image sensor 21, an image forming circuit 23 having a recording circuit, a control circuit 24 having a still video back contol microcomputer, a mechanical device (not shown) having a motor for driving a head for recording an image on a magnetic disk. The flash unit 3, which is mounted on a hot shoe 25 of the camera body 1, is equipped with a flash control circuit 27 for controlling activation of xenon lamp 26, means 28 for setting flashlight emission angle to be driven based on focal length information of the interchangeable lens 4, and a lens 29 for light projection. The flashlight coverage setting means 28 includes a motor, a motor control circuit, transmission gears 30 and 31 for transmitting the rotation of the motor, a rack gear 32 meshed with the gear 31, and a cylinder 33 holding the lens 29 on the forward end thereof, whereby the lens 29 is moved forward and backward in accordance with the focal length information of the lens 4.

Figure 4:
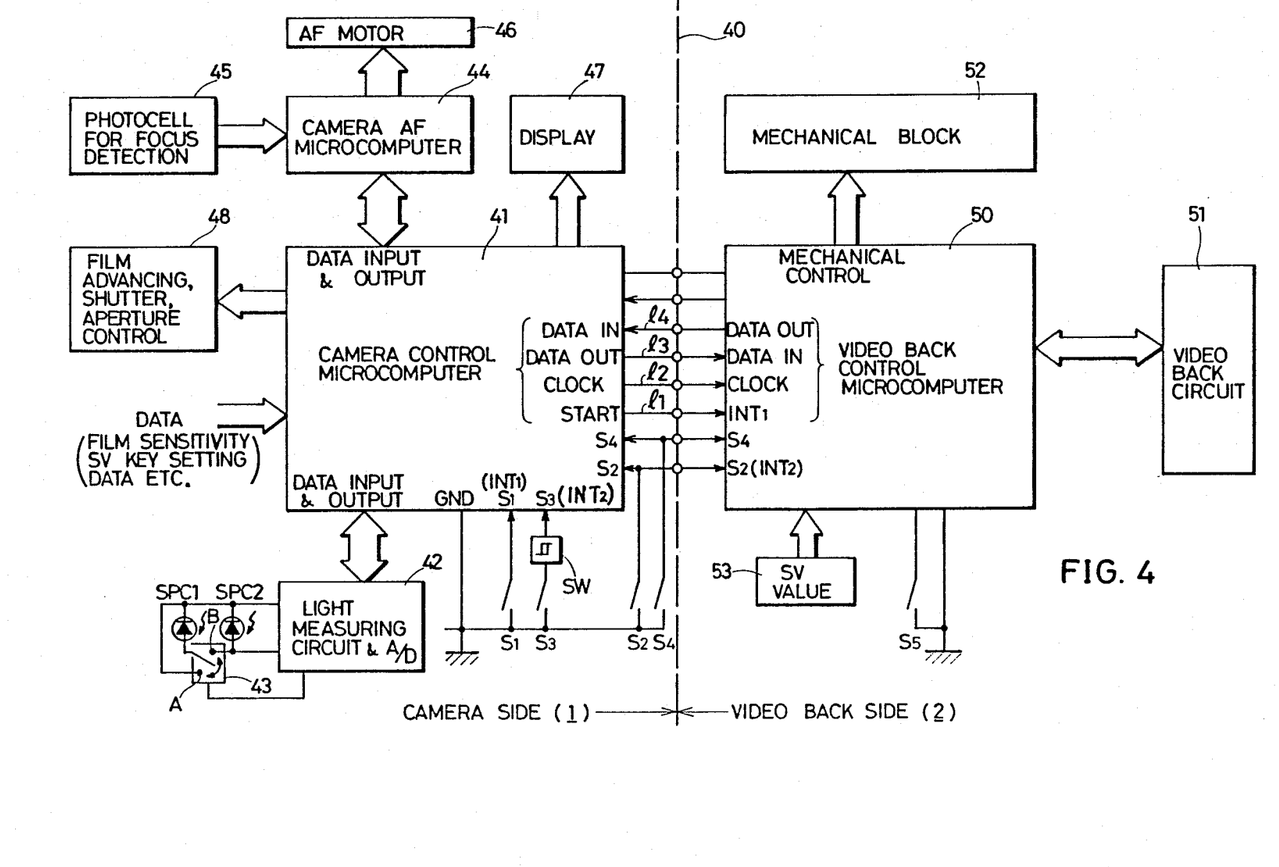
FIG. 4 is a block diagram showing the arrangement of the still camera system according to the invention.

FIG. 4 is a block diagram of the substantial arrangement of the camera body with the still video back installed according to the system of the present invention. As shown, in FIG. 4, the camera body 1 is shown in the left side of a partition line 40 and the still video back 2 is shown in the right side of the same. The numeral 41 is a camera control microcomputer which is installed within the camera to be the central control unit of the camera system and activated by command signals from switches S1, S2, S3 and S4. The switch S1 is a light-measuring switch which is turned on when a release button 54 is pressed halfway and thus, light measurement, focus detection and data exchange, etc will commence. When the switch S1 remains on, each circuit of the system is live. The switch S2 is a release switch which is turned on when the release button S4 is pressed to a full extent and thus, exposure control operation of the camera will commence. The switch S3 is a rear cover detecting switch which will be turned on when the rear cover is closed (or the still video back is installed). Represented by SW is a pulse generating circuit which sends one pulse to an interrupt terminal INT2 when the switch S3 is turned from its on-position to its off-position and vice versa. The switch S4 is adopted for indicating the state of film advancing and shutter cocking and will be turned on when the exposure control operation on the camera is completed and off when the film advancing and shutter cocking are completed.

The numeral 42 is a light measuring circuit which, as activated when the switch S1 is turned on, measures the brightness of an object to be photographed according to input signals from first and second photoelectric converting elements SPC1, SPC2 and, upon converting the resulting data into digital signals, sends the digital signals to the camera control microcomputer 41. The second photoelectric converting element SPC2 is used in either mode of the film back or of the still video back while the first photoelectric converting element PSC1 is particularly used only in the film back installing mode. Such selection can be made by means of a switch 43 which is switched according to control signals sent via the light measuring circuit 42 from the camera control microcomputer 41.

The first photoelectric converting element SPC1 is provided for receiving light in a relatively wide area of a camera viewfinder while the second photoelectric converting element SPC2 is provided for receiving light in a small area thereof about the center of the camera viewfinder, and is used, in the film back installing mode, for so-called spot light measurement.

The numeral 44 is a microcomputer for auto-focus control which exchanges signals with the camera control microcomputer 41 and additionally, activates an auto-focus motor 46 for focusing in accordance with the resulting data upon detecting focus condition of the interchangeable lens 4 in relation to the data from a photocell 45 for focus detection. The numeral 47 is a display device including liquid crystal display (LCD) which indicates various data. The camera control microcomputer 41 can also receive various data, e.g. film sensitivity SV with the film back installed and will in turn send control signals to a controlled circuit 48 for film advancing, shutter travelling, diaphragm driving, etc.

The still video back 2 comprises a video back control microcomputer 50, a video back circuit 51 including CCD image sensor, signal processing and recording circuits, and a mechanism block 52 for driving a magnetic disk and a head. The still video back 2 further comprises a switch S5 for choosing between the modes of field recording and frame recording to record the data on a magnetic disk and a CCD sensitivity output circuit 53 which outputs a CCD sensitivity data equivalent to a film sensitivity. The switch S5 sould be turned on for the frame recording and off for the field recording. The camera control microcomputer 41 and the video back control microcomputer 50 exchange data via four signal lines 11, 12, 13 and 14. A start-up signal of exchanging the data is sent from the camera control microcomputer 41 through the line 11 in response to the turn-on of the light-measuring switch S1. The video back control microcomputer 50 receives the start-up signal as an interrupt signal and thus, will exchange the data upon synchronizing with clock signals fed from the camera control microcomputer 41 via the line 12.

Figure 2:
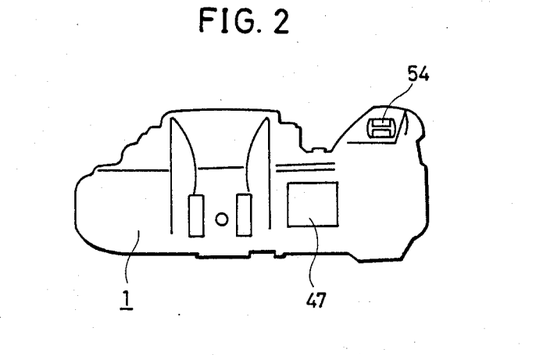
FIG. 2 is a plane view of a camera body showing the position of a display.
Figure 3A:
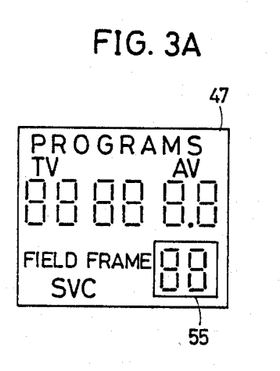
Figure 3B:
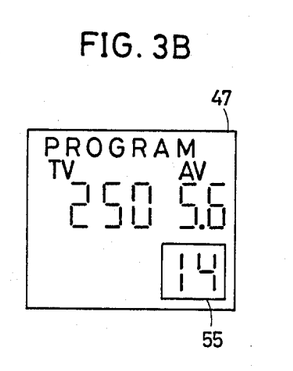
Figure 3C:
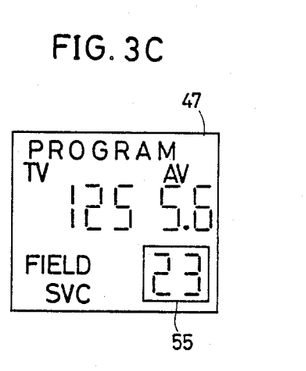

The display 47 is mounted to the top of the camera body 1 as shown in FIG. 2 and detailed indications are shown in FIGS. 3-A, 3-B, and 3-C. Illustrated in FIG. 3-A is an indication when all the segments and characters to be displayed, in FIGS. 3-B is when the film back installing mode is selected, and in FIG. 3-C is when the still video back installing mode is selected. The segments in the display 47 include generally a common section (PROGRAMS, TV, AV, etc) and a specific section (FIELD, FRAME, SVC). The numeral 55 is a counter display portion indicating counting numbers of the film when the film back is installed and of the recording tracks when the still video back is installed. In the common section, the characters, PROGRAM, A, B, and M are displayed when the programmed automatic exposure control mode, and the manual exposure control mode is selected, respectively.

The character SVC (still video camera) is displayed in the still video back installing mode with the character FIELD or FRAME representing the field or frame recording mode indicated. Numbers of the recording tracks can also be read from the counter display 55. The common section including the display 55 indicates, with or without the still video and film backs installed, appropriate value for the respective still video back and film back installing modes. It is known that the film sensitivity and presence of a film cartridge are commonly displayed at the initial loading operation in the film back installing mode, which may also be utilized in this system.

In addition to the aforesaid indications, the presence of a disc cassette or the state of white balance adjustment may be displayed in the still video back installing mode.

The operation of circuits in FIG. 4 will be described herein below according to the flow charts in FIGS. 5 to 12.

When the switch S1 is turned on with the release button S4 pressed halfway, the auto-focus control microcomputer 44 and the light-measuring circuit 42 is energized. Instantly, a signal from the camera control microcomputer 44 is sent via the signal line 11 thus to energize the video back control microcomputer 50 as well as to connect its peripheral circuits in the still video back 2 with the power supply.

Consecutively, while various data information including film sensitivity SV is loaded, the installation of the still video back 2 is checked and the video back control microcomputer 50 starts exchanging the data.

Figure 7:
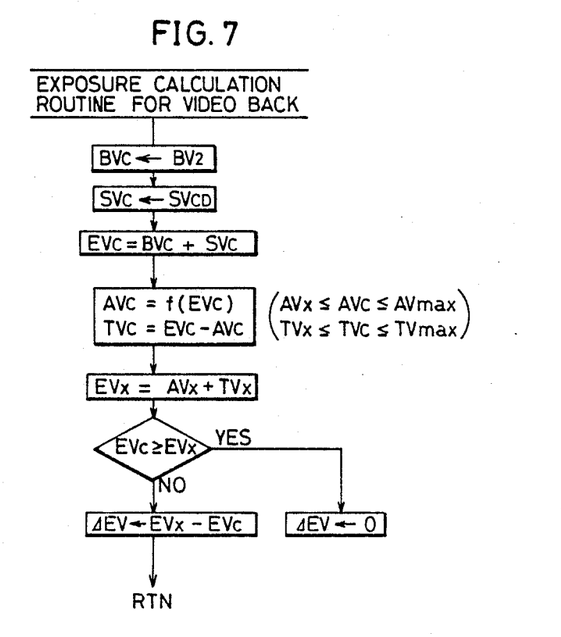
FIG. 7 is a flow chart showing another part of the same in detail.

The information transferred from the camera body 1 to the still video back 2 include the data of date or actual time to be written in the specific data tracks on a magnetic disk, and the exposure error data $\Delta EV$ to be compensated. As shown in FIG. 7, this $\Delta EV$ is the exposure error data in the still video back installing mode, resulting from a narrower available range of the shutter speed and diaphragm aperture in the still video back installing mode than that in the film installing mode. When less light is given, the shutter speed or diaphragm aperture value to be controlled will exceed the available range thereof. If the output of CCD is gain-controlled according to the $\Delta EV$ data when the release is activated, the exposure error can be eliminated electrically by the gain-control of the CCD output.

The information transferred from the still video back 2 to the camera body 1 include the data representing the still video back installation, CCD sensitivity data aperture lower-limit data, shutter speed lower-limit data, field/frame selection data, counter data, warning data, and release inhibiting data.

The counter data means track count numbers on a magnetic disk ranging from 1 to 50. Every release operation counts +1 in the field recording and counts +2 in the frame recording. When the counting number exceeds 50, the warning data is transmitted to a display a warning on the camera body side. The release inhibiting data is sent out when the release is not allowed to activate on the still video back side, i.e. when the motor for driving a magnetic disk rotates inconstantly (at startup), the recording is being made after releasing, the head is being driven, or the magnetic disk is just in the operation of head searching. Although the data exchange between the camera body 1 and the still video back 2 is effected at a predetermined timing as shown in a flow chart of FIG. 5, it may be done at a desired timing in relation to the types and properties of the data.

Figure 5:
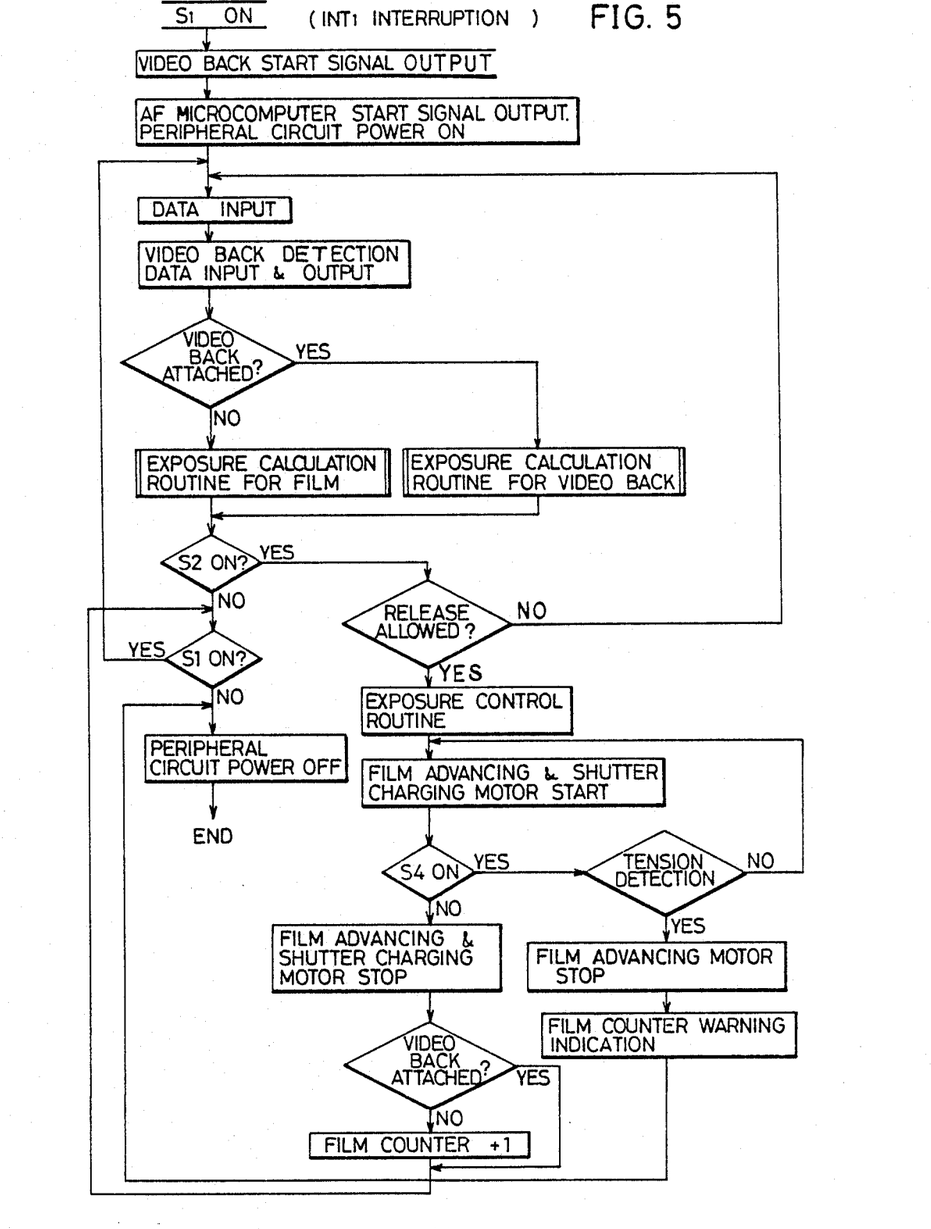
FIG. 5 is a flow chart showing a control sequence, mainly at a camera control microcomputer, in the system of FIG. 4.
Figure 6:
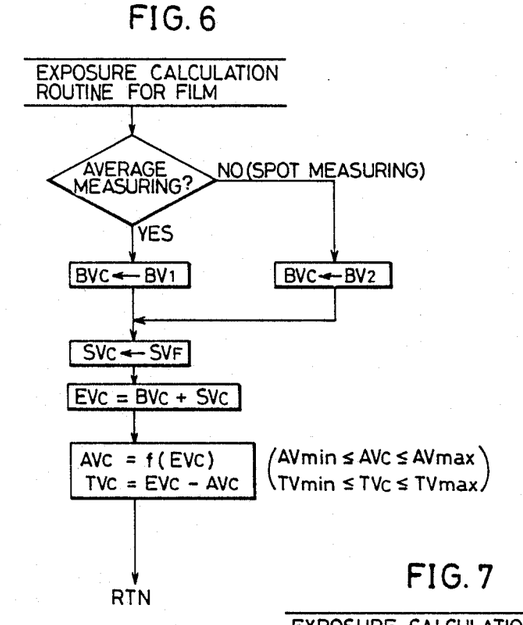
FIG. 6 is a flow chart showing a part of the sequence in detail.

As best shown in FIG. 5, the attachment of the still video back is checked after the data are exchanged and the exposure calculation will then be made according to the routine shown in FIG. 6 if the answer is "no" or to the routine shown in FIG. 7 if the answer is "yes". Then, the calculated shutter speed and/or diaphragm aperture value are displayed on the display 57 together with the selected exposure control mode.

The simbols used in FIGS. 6 and 7 are as follows:
BV1: Brightness value provided from the first photoelectric converting element (SPC1) having a relatively greater light receiving area on the image screen of a 35 mm film,
BV2: Brightness value provided from the second photoelectric converting element (SPC2) having a smaller light receiving area about the center of the screen,
BVC: Brightness value applicable for exposure control,
SVC: Film sensitivity value applicable for exposure control,
SVF: Film sensitivity value which has been preset automatically or manually,
EVC: Exposure value applicable for exposure control,
AVC: Control diaphragm aperture value
TVC: Control shutteer speed value
AVmin, AVmax: Lens aperture upper and lower limit value,
TVmin, TVmax: Shutter speed upper and lower limit value,
SVCD: Equivalent film sensitivity value determined by the sensitivity of a CCD image sensor of the still video back.
AVX: Aperture lower limit value with the still video back installed.
TVX: Shutter speed lower-limit value with the still video back installed.
EVX: Exposure lower-limit value with the still video back installed.
$\Delta$EV: Exposure error value with the still video back installed.

Center-weighted average light-measuring in the film back installing mode is effected, as shown in FIG. 6, such that, while the switch 43 shown in FIG. 4 is turned to a contact position B, the first and second photoelectric converting elements SPC1, SPC2 produce the light measurement outputs which are in turn utilized for determining the brightness value BVC. Spot light-measuring is effected such that, while the switch 43 is turned to the other contact position A, only the second photoelectric converting element SPC2 produces the output to be used while the first photoelectric converting element SPC1 is short-circuited at both ends.

During the video back exposure calculation shown in FIG. 7, the switch 43 is turned to the A-position as set forth above while only the second photoelectric converting element SPC2 is activated. This means that a range of the light measuring is set to a small area in the still video back installing mode. Additionally, as shown in FIG. 6 (of the film back installing mode), the film sensitivity SVF is set as film sensitivity SVC. The exposure value EVC, the control diaphragm aperture value AVC, and the control shutter speed value TVC are arithmetically determined based on the values BVC and SVC. By comparison, as shown in FIG. 7 (of the still video back installing mode), the equivalent film sensitivity SVCD determined by the sensitivity of the CCD 21 is set as film sensitivity SVC. In the same manner, the exposure value EVC, the control diaphragm aperture value AVC, and the control shutter speed value TVC are arithmetically determined. The aforesaid exposure error $\Delta$EV is also calculated in the routine shown in FIG. 7.

The control diaphragm aperture value AVC and the control shutter speed value TVC are restricted within the available range intrinsic to the interchangeable lens 4 and the camera body 1 as shown in FIG. 6, i.e. AVmin$\leq$AVC$\leq$AVmax and TVmin$\leq$TVC $\leq$TVmax. In case of the still video back installing mode, the lower limit of the diaphragm aperture value AVC is further restricted to the value AVX as shown in FIG. 7. This results from a concept that the equivalently largest aperture opening of the relay optical device 19 should be examined. The lower limit of the control shutter speed value TVC is also restricted to the lower limit value TVX in the same manner. The exposure control is carried out based on the calculated values AVC and TVC.

When the exposure control action is completed, the switch S4 is turned on thus to activate the motor for film advancing and shutter cocking. This motor is also activated in the still video back installing mode. While the switch S4 remains turned on, the tension detection can be effected to prevent damage to the film which is kept at tension both with its last frame being unable to advance. When the film advancing and shutter cocking are completed, the switch S4 is turned off to stop the motor.

According to the embodiment as set forth above, the camera body 1 and the still video back 2 when installed are electrically connected with connecting terminals through which the information on the still video back is transferred to the camera body side so that, in either case that the still video back or the film back is installed, optimum mode selection can be made by choosing an appropriate control routine upon examining the attachment of the still video back in accordance with the interruption routine of the camera control microcomputer 41, as "yes" for the still video back installing mode and "no" for the film back installing mode.

Figure 8:
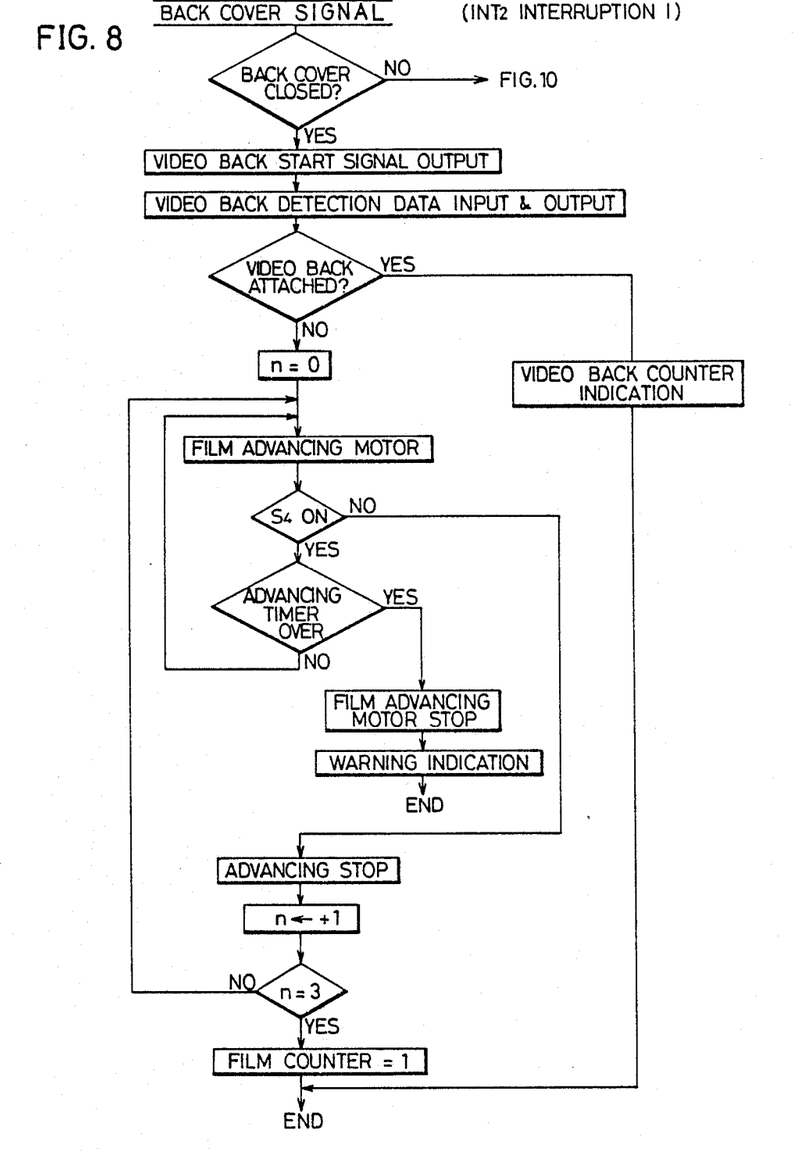
FIG. 8 is a flow chart of control sequence in the system of FIG. 4 while a back cover of the camera body is closed.

Such an optimum mode selection can also be made when the back cover of the camera body is closed. FIG. 8 shows an interrupt control routine for the case that the back cover is closed. According to the routine, first, the position of the back cover is examined when interruption has been made and then, if the cover is in its closing position, a video back start signal is output for the energization of the still video back and the data exchange between the camera body and the still video back, whereby the attachment of the still video back is detected. Then, the counter reading representing the track number of the still video back is displayed when the still video back is found in installation, or the initial loading operation intrinsic to the film back installing mode will commence when the absence of the still video back is recognized (i.e. the film back is installed). For the operation, a value n, which is assigned in a register installed within the camera control microcomputer 41, is reset (n=0) and then, the motor for film advancing and shutter cocking is driven. Consecutively, when the switch S4 becomes turned off as having been examined, the film advancing stops and the value n in increased by 1. The motor rotates again until the value n reads 3. When the switch S4 is on as having been examined, it will be examined if the time of driving the motor exceeds a predetermined time of advancing one frame of the film. If the former exceeds the latter, the loading motor is stopped while a warning signal is displayed. When the value n is 3 (n=3) as the film is advanced with its first frame ready for normal exposures, the film counter reads 1 indicating that the initial film loading has been completed. In this manner, when the back cover of the camera is closed, optimum mode selection can be made for desirable photography whichever of the film and still video backs is installed.

Figure 9:
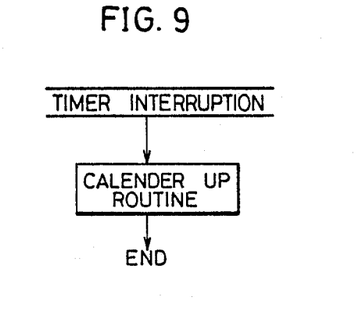
FIG. 9 is a flow chart of timer interrupt routine in the system.

FIG. 9 shows a time interrupt routine in relation with an interruption per second for a clock, in particular. The data counted up by the second in the camera body 1 is transferred to the still video back side. This can only be effected when the camera body 1 accommodates a data imprinting device.

Figure 10:
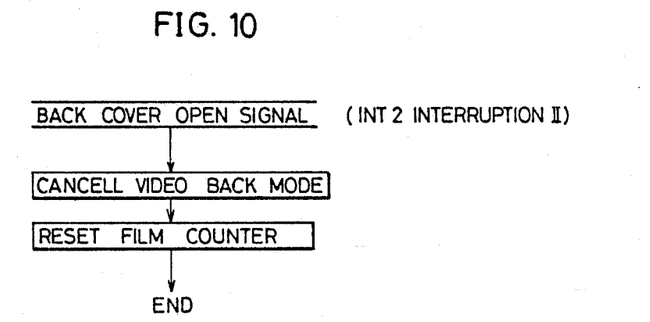
FIG. 10 is a flow chart of interrupt routine while the back cover is opened.

Illustrated in FIG. 10 is a detail routine effected on detecting the opening of the back cover shown in FIG. 8. When the back cover of the camera is opened, the still video back mode is cancelled while the film counter becomes reset.

Finally, the operation on the still video back will be described referring to the flow charts of the video back control microcomputer 50 shown in FIGS. 11 and 12.

Figure 11:
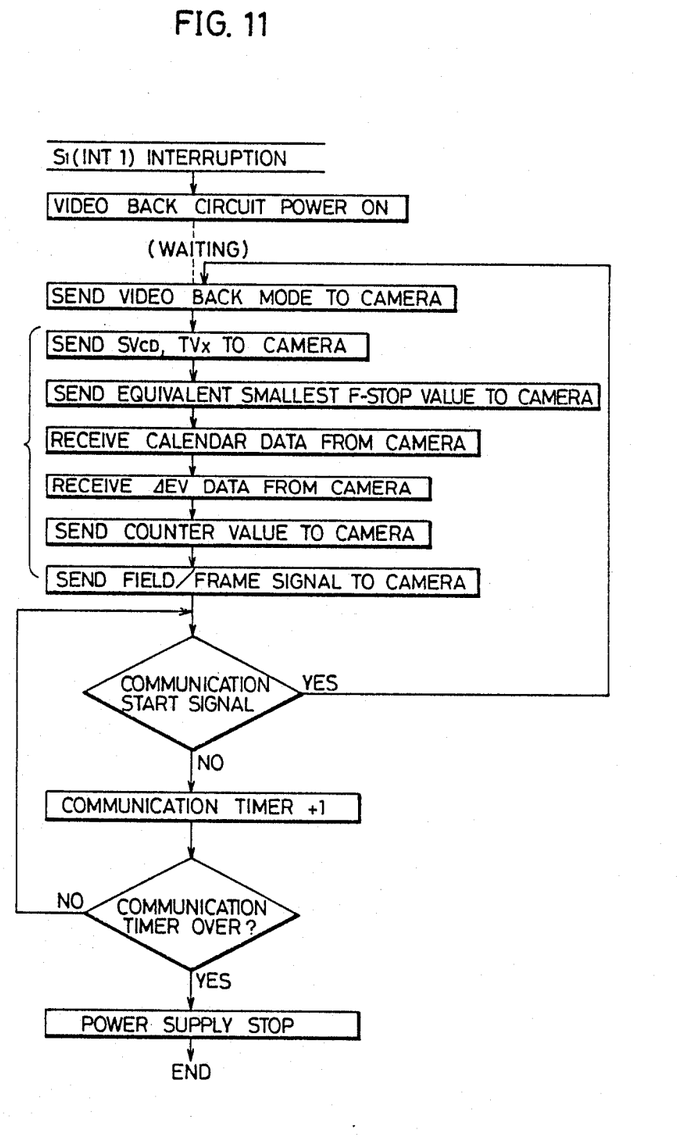
FIGS. 11 and 12 are flow charts, mainly of a video back control microcomputer in the still video back.

As shown in FIG. 11, when the light-measuring switch S1 contained within the camera body 1 is turned on, a startup signal for the energization of the still video back is transmitted from the camera control microcomputer 41 to the interrupt terminal INT1 of the video back control microcomputer 50. Upon receiving a pulse of the startup signal, the video back control microcomputer 50 commences the operation according to the flow chart shown in FIG. 11 as with energizing the video back circuit 51. The video back control microcomputer 50 is kept on standby until the communication start signal is introduced to the interrupt terminal INT1. Various information, e.g. film sensitivity data, is transferred to the camera control microcomputer 41 from which the communication start signals are in turn sent out. Upon receiving the communication start signal, the video back control microcomputer 50 starts exchanging the various information shown in FIG. 11 with the camera control microcomputer 41. A series of the communication start signals are produced periodically while the light-measuring switch S1 is on, as apparent from the flow chart shown in FIG. 5. When the communication start signal disappears, a communication timer will count up (FIG. 11). Then, when the timer overflows, the video back circuit 51 is deenergized and thus, the video back control microcomputer 50 will stop operating. The operation of the communication timer means that the video back circuit 51 can continue to operate for a specific period of time after the light-measuring switch S1 is turned off. In case that a shutter release is needed after the light-measuring switch S1 is turned off, it will take a considerable period of time to rotate the magnetic disk constantly after restarting it once the still video back 2 is de-energized with the light-measuring switch S1 turned off, which will prevent normal recording of photographic images. Therefore, the communication timer is utilized to maintain the constant rotation of the magnetic disk for a certain period of time after the light-measuring switch S2 is turned off. The extending period of time (timer time) may be, although not limited to, a few seconds.

Figure 12:
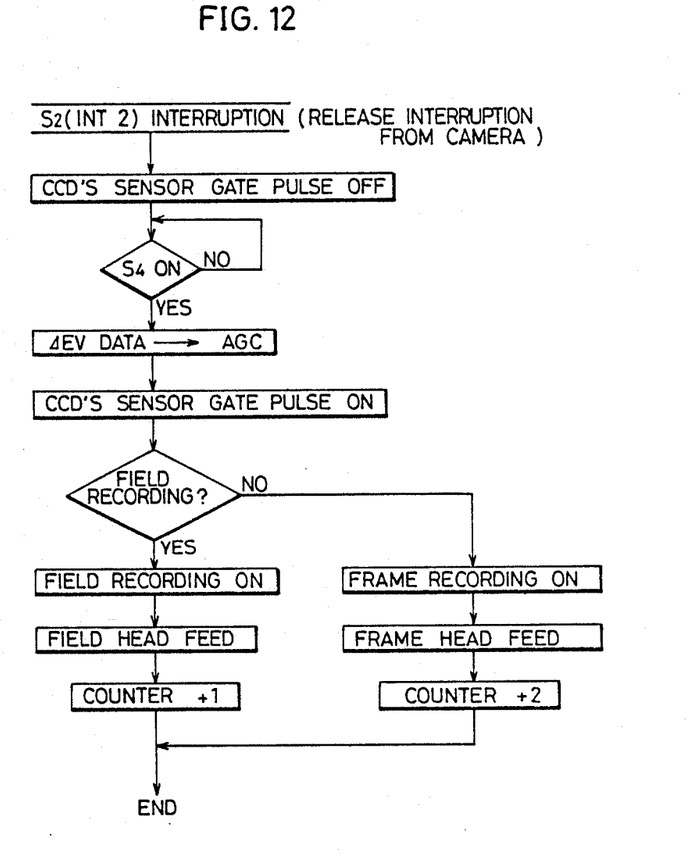

FIG. 12 shows a flow chart for a release interruption effected by the camera body 1. When a release signal is transmitted through interrupt terminal INT2 of the video back control microcomputer 50, a gate pulse of the CCD 21 is cut off thus to prevent the storage data of the CCD from being shifted.

While the storage data of the CCD in a TV camera is shifted every 1/60 of a second, the same in a still video camera has to be shifted only after the shutter is closed because an action of the shutter release is voluntary and a rate of shutter speed is not uniform. Accordingly, the shifting can be prevented (as the gate pulse is off) when the shutter release is effected and otherwise, can be permitted (as the gate pulse is on) when the exposure is completed (i.e. the switch S4 is turned on). After the switch S4 is turned on, automatic gain control AGC according to the ΔEV data from the camera control microcomputer 41 is made on a signal amplifier contained within the video back circuit 51. Consecutively, as shown in FIG. 12, the routine divides into two branches for their respective field and frame recording modes of the still video back.

As set forth above, there are some differences between the still video back installing mode and the film back installing mode and thus, appropriate settings for photographing relative to their respective modes are now apparent from the above description. The principles of the present invention are not limited to the preferred embodiment and other modifications are possible without departing from the scope of the present invention.

According to the present invention, the readings in the film back installing mode and the still video back installing mode are alternatively displayed on the display of the camera body so that one single display can visibly indicate all the information. In addition, a switch means provided within the camera body is arranged so as to respond to the input information of signal input means, which allow a means for providing the display readings to be selected automatically. It will be understood that this principle of the present invention is most suitable to a still camera system which can carry alternatively a still video back or a film back.

Furthermore, according to the present invention, the camera body accommodates a film back mode setting means for providing an optimum condition for photographing while the film back is installed and also, a still video back mode setting means for providing the same while the still video back is installed. In addition, a switching means provided within the camera body is arranged so as to respond to the input information of signal input means, which allows the mode setting means to be selected automatically.

What is claimed is:

1. A still camera system comprising a camera body which is arranged to carry alternatively a film back or a still video back having a solid-state image pickup device for receiving still images in order to record on a recording medium, the improvement comprising: a display; a signal input means for receiving input signals indicating the attachment of either the film back or the still video back; a first means for providing the display information in a film back installing mode to said display; a second means for providing the display information in a still video back installing mode to said display; and a switching means for selecting between said first and second means corresponding to the input information of said signal input means.

2. A still camera system, as defined in claim 1, wherein the display information provided from said first means includes about number of exposed frame of a film, while the display information provided from said second means includes data about track number of said recording medium.

3. A still camera system, as defined in claim 1, wherein the display information provided from said second means includes data representing the attachment of said still video back.

4. A still camera system, as defined in claim 1, wherein the display information provided from said second means includes data representing a recording mode selected in said still video back between field recording and frame recording.

5. A still camera system comprising a camera body which is arranged to carry alternatively a film back or a still video back having a solid-state image pickup device for receiving still images in order to record on a recording medium, the improvement comprising: a film back mode setting means for providing an optimum condition for photographing with the film back installed; a still video back mode setting means for providing an optimum condition for photographing with the still video back installed; a distinction means for recognizing the attachment of either the film back or the still video back; an initial feeding means for feeding the film in the predetermined position; and a means for activating said initial feeding means when the attachment of the film back is recognized and deactivating the same when the attachment of the still video back is recognized.

6. A still camera system comprising a camera body which is arranged to carry alternatively a film back or a still video back having a solid-state image pickup device for receiving still images in order to record on a recording medium;

the improvement comprising: a film back mode setting means for providing an optimum condition for photographing with the film back installed; a still video back mode setting means for providing an optimum condition for photographing with the still video back installed; a distinction means for recognizing the attachment of either the film back or the still video back; an output means for providing a minimum opening diaphragm aperture value and a full-open diaphragm aperture value of an interchangeable lens; a reading means for reading a restricted diaphragm aperture value of the still video back; and a means for determining a control diaphragm aperture value taken into consideration said minimum opening diaphragm aperture value, full-open diaphragm aperture value, and restricted diaphragm aperture value when the attachment of the still video back is recognized, and determining a control diaphragm aperture value taken into consideration said minimum opening diaphragm aperture value and full-open diaphragm aperture value when the attachment of the film back is recognized.

7. A still camera system comprising a camera body which is arranged to carry alternatively a film back or a still video back having a solid-state image pickup device for receiving still images in order to record on a recording medium, the improvement comprising: a film back mode setting means for providing an optimum condition for photographing with the film back installed; a still video back mode setting means for providing an optimum condition for photographing with the still video back installed; a distinction means for recognizing the attachment of either the film back or the still video back; an output means for providing data relative to the minimum exposure time and the maximum exposure time of a shutter respectively; a reading means for reading data relative to a restricted exposure time of the still video back; and a means for determining a control exposure time taken into consideration said minimum time when the attachment of the still video back is recognized, and determining a control exposure time taken into consideration said minimum exposure time and maximum exposure time when the attachment of the film back is recognized.

8. A still camera system comprising a camera body which is arranged to carry alternatively a film back or a still video back having a solid-state image pickup device for receiving still images in order to record on a recording medium, the improvement comprising: a film back mode setting means for providing an optimum condition for photographing with the film back installed; a still video back mode setting means for providing an optimum condition for photographing with the still video back installed; a distinction means for recognizing the attachment of either the film back or the still video back; a means for advancing a film and cocking a shutter mechanism; a detecting means for detecting the tension on the film during the operation of said driving means; and a means for activating said detecting means when the attachment of the film back is recognized and deactivating the same when the attachment of the still video back is recognized.

9. A still camera system comprising a camera body which is arranged to carry alternatively a film back or a still video back having a solid-state image pickup device for receiving still images in order to record on a recording medium, the improvement comprising: a film back mode setting means for providing an optimum condition for photographing with the film back installed; a still video back mode setting means for providing an optimum condition for photographing with the still video back installed; a distinction means for recognizing the attachment of either the film back or the still video back; a selecting means for selecting an area of measuring light for exposure control; and a means for restricting a choice of the light-measuring area when the attachment of the still video back is recognized, and cancelling the restriction on the choice of the same when the attachment of the film back is recognized.

* * * * *